(12) United States Patent
Weiner et al.

(10) Patent No.: US 11,461,505 B2
(45) Date of Patent: Oct. 4, 2022

(54) OBFUSCATION OF OPERATIONS IN COMPUTING DEVICES

(71) Applicant: Arm Limited, Cambridge (GB)

(72) Inventors: Michael Weiner, Ness-Ziona (IL); Oded Golombek, Even Yehuda (IL); David Yellin, Ganey-Tikva (IL)

(73) Assignee: ARM LIMITED, Cambridge (GB)

( * ) Notice: Subject to any disclaimer, the term of this patent is extended or adjusted under 35 U.S.C. 154(b) by 204 days.

(21) Appl. No.: 16/656,362

(22) Filed: Oct. 17, 2019

(65) Prior Publication Data
US 2021/0117575 A1 Apr. 22, 2021

(51) Int. Cl.
| | |
|---|---|
| *G06F 21/62* | (2013.01) |
| *H04L 9/06* | (2006.01) |
| *G06F 15/16* | (2006.01) |
| *G06F 21/36* | (2013.01) |
| *G06F 21/75* | (2013.01) |
| *G06F 9/448* | (2018.01) |
| *G06F 21/60* | (2013.01) |

(52) U.S. Cl.
CPC .......... *G06F 21/755* (2017.08); *G06F 9/4498* (2018.02); *G06F 21/60* (2013.01)

(58) Field of Classification Search
CPC ...... G06F 21/755; G06F 9/4498; G06F 21/60; G06F 2221/2123; G06F 21/556; G06F 21/75; H04L 9/004
See application file for complete search history.

(56) References Cited

U.S. PATENT DOCUMENTS

2011/0296198 A1* 12/2011 Motoyama ............ G06F 21/602
713/189

FOREIGN PATENT DOCUMENTS

| GB | 2399426 A | * | 9/2004 | .......... G06F 11/1695 |
| GB | 2399426 A | | 9/2004 | |
| WO | WO-2016153430 A1 | * | 9/2016 | .......... G06F 21/6254 |

OTHER PUBLICATIONS

Duy-Phuc Pham; Damien Marion; Matthieu Mastio; Annelie Heuser; "Obfuscation Revealed: Leveraging Electromagnetic Signals for Obfuscated Malware Classification"; ACSAC: Annual Computer Security Applications Conference; Dec. 2021; pp. 706-719 (Year: 2021).*

"International Search Report and Written Opinion Issued in International Patent Application No. PCT/GB2020/052493", dated Dec. 7, 2020, 13 Pages.

* cited by examiner

*Primary Examiner* — Shewaye Gelagay
*Assistant Examiner* — Courtney D Fields
(74) *Attorney, Agent, or Firm* — Talem IP Law, LLP

(57) ABSTRACT

A method for obfuscation of operations using minimal additional hardware is presented herein. The method can begin by executing a first iteration of a set of computations, the execution of the set of computations resulting in a first iteration output. The method can continue by executing a second iteration of the set of computations, wherein the second execution is distinct from the first iteration but should satisfy a matching condition. The distinction can be a rearrangement of sub-operations, insertion of dummy sub-operations, or a combination of the two. After the iterations are complete, the iteration outputs can be compared. If the comparison of the first iteration output and the second iteration output satisfy the matching condition, the process result can be output. If the matching condition is not satisfied, an error detected signal can be output.

14 Claims, 5 Drawing Sheets

OBFUSCATION OF OPERATIONS IN COMPUTING DEVICES

BACKGROUND

Tampering, or hacking, of an electronic system can give unauthorized users access to sensitive information. An example of such sensitive information can be secret key information used in cryptography engine implementations, such as AES (Advanced Encryption Standard). A Differential Fault Analysis (DFA) is a type of side channel attack which induces faults into cryptographic implementations to reveal their internal states. These faults can be induced by a variety of methods, including applying a high temperature, applying unsupported supply voltage or current, causing excessively high overclocking, applying strong electric or magnetic fields, or even applying ionizing radiation.

BRIEF SUMMARY

Methods of obfuscating operations of a computing device are provided. The described methods are suitable for protecting against DFA attacks. Obfuscation of operations in processes such as cryptographic processes or other sensitive, iterative processes, can be carried out through inserting dummy operations, rearranging operations, or both.

An obfuscation method and countermeasure can begin by executing a first iteration of a set of computations, the execution of the set of computations resulting in a first iteration output. The method can continue by executing a second iteration of a set of computations, wherein the second execution is distinct from the first iteration but should result in the same iteration output. The execution of the set of computations resulting in a second iteration output. The difference between performing the first iteration and the second iteration can be a rearrangement of valid sub-operations, insertion of dummy sub-operations, or a combination of the two. After two iterations are complete, the iteration outputs can be compared. If the first iteration output and the second iteration output satisfy a matching condition, the result, for example cipher text, can be provided as intended within the computing system. Otherwise, the result may be discarded and a notification can be provided to a processor for potential countermeasures.

A system for obfuscation of operations is described. The system with operation obfuscation can include circuitry for performing a process, the process comprising a plurality of sub-operations, each sub-operation being separately selectable for operation; a comparator coupled to receive an output of the circuitry to compare outputs from iterations of the process, the comparator outputting an error detected signal when a matching condition for the outputs from the iterations of the process is not satisfied; and control circuitry coupled to the circuitry for performing the process, the control circuitry configured to select sub-operations of the process to execute a first iteration of a set of computations, the execution of the set of computations resulting in a first iteration output and select the sub-operations of the process to execute a second iteration of the set of computations, the execution of the set of computations resulting in a second iteration output, wherein the control circuitry causes the second iteration to be distinct from the first iteration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2A shows obfuscation using dummy operations, FIG. 2B shows obfuscation using reordering of operations, and FIG. 2C shows obfuscation using both dummy operations and reordering of operations.

DETAILED DESCRIPTION

Methods of obfuscating operations of a computing device are provided. The described methods are suitable for protecting against DFA attacks by, for example, increasing the difficulty of synchronization. Obfuscation of operations in processes such as cryptographic processes or other sensitive, iterative processes can be carried out through inserting dummy operations, rearranging operations, or both. Insertion of dummy operations can make the duration of a process having a set of operations not easily discernable and rearranging operations of a set of operations of a process can make it very difficult to inject at the same point in the process.

Although the described methods are provided in the context of cryptographic systems, it should be understood that the methods are applicable to other systems in which protection against differential fault analysis attacks is desired. Advantageously, certain methods described herein can be implemented using the existing hardware within a cryptographic engine, including, but not limited to, state machines and counters. In some cases, an attack may be identified during operation of the described methods and the computing device can leverage the identification of the attack to increase security by implementing more countermeasures.

Some cryptographic systems utilize AES encryption. AES is generally composed of a number of rounds that progressively transform an input (a state) through repeated operations and mixing the result progressively with round keys. Round keys are generally derived from an AES key. Common operations performed in each round, for an encryption, include SubBytes (SBOX—substitution box—non-linear operation), ShiftRows (which shifts rows of the state matrix that represents the input), MixColumns (linear transformation of each column of the state matrix), and AddRoundKey (an XOR between the state and a round key).

One approach to protect against DFA attacks on a cryptographic system involves duplicating the computation and comparing the final results of the two computations. In particular, one such countermeasure, illustrated in FIG. 1, includes three steps: an initial computation step comprised of a set of computations that are grouped into distinct sub-operations, one or more repeating computation steps using the exact same inputs used by the initial computation step, and a comparison step comparing the results of the initial and repeating computations. If the results produced by this process match, a cryptographic engine produces the output; otherwise the cryptographic engine excludes the output and alerts the upper level.

Figure 1:
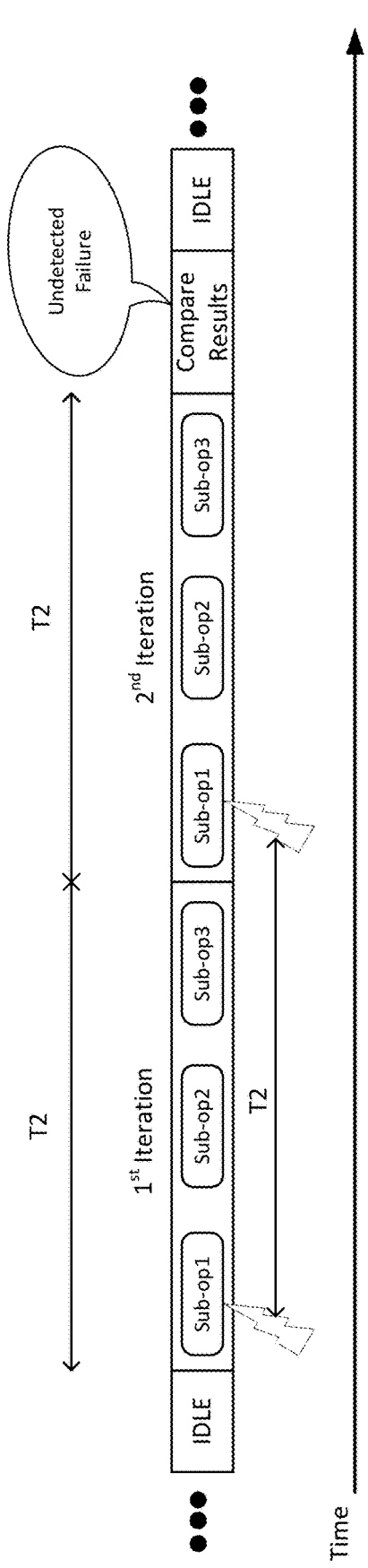
FIG. 1 illustrates a timing diagram of a conventional Differential Fault Analysis (DFA) attack countermeasure.

FIG. 1 illustrates a timing diagram of a conventional DFA attack countermeasure. As shown in FIG. 1, the system may originally be idle until the process of interest is invoked. For example, in a cryptographic process, a plaintext may be received as part of an encryption operation or ciphertext may be received as part of a decryption operation. Three sub-operations are shown for each iteration. As described above, the same input can be applied to two iterations and the results are compared. For example, the input may be plaintext and the result may be cipher text. In this illustration, each iteration performs the same process and takes the same amount of time, T2. The result of the first iteration is stored and then compared to the result of the second iteration using a comparator (which may include the register/storage storing the result of the first iteration).

However, an experienced attacker can leverage known information about the system, such as the duration, to eventually duplicate the fault exactly across two compared iterations (e.g., injecting the fault with a period of T2), thus thwarting the comparison step and producing the faulty cipher text without alerting the system of the attack.

For example, the duration of the entire computation can be determined by examining timing of inputs and outputs. With this knowledge, the attacker can inject a fault at precisely the same time in two consecutive cycles. Eventually, the injection will be precise enough, and the cycles will both be checked by the same comparison such that the two disrupted operations produce the same output. In this case, the system will not detect an attack, and the faulty cipher text can be viewable by the attacker.

Figure 2A:
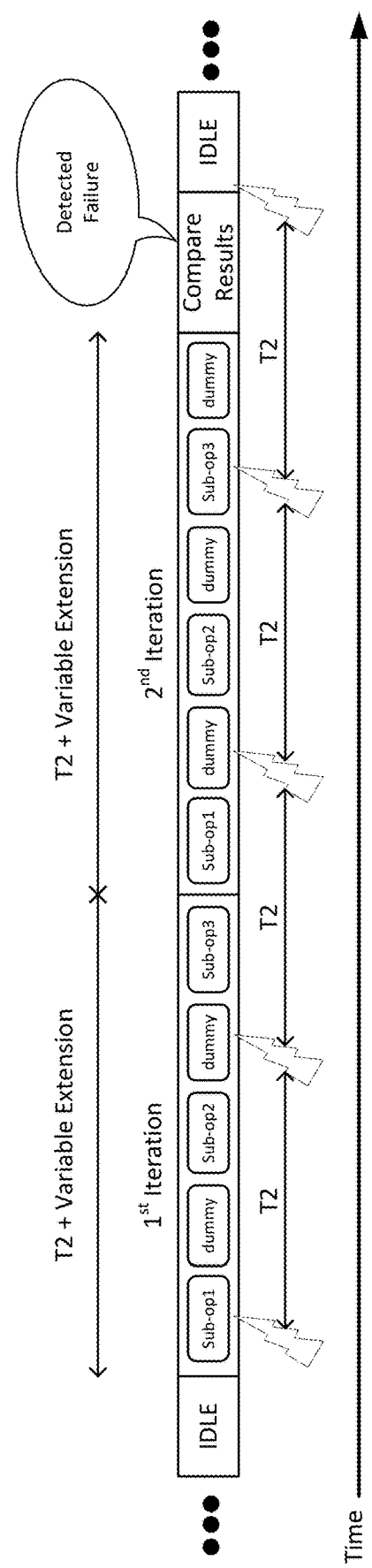
FIGS. 2A-2C illustrate timing diagrams of a DFA attack countermeasure with obfuscation.
Figures 2B, 2C:
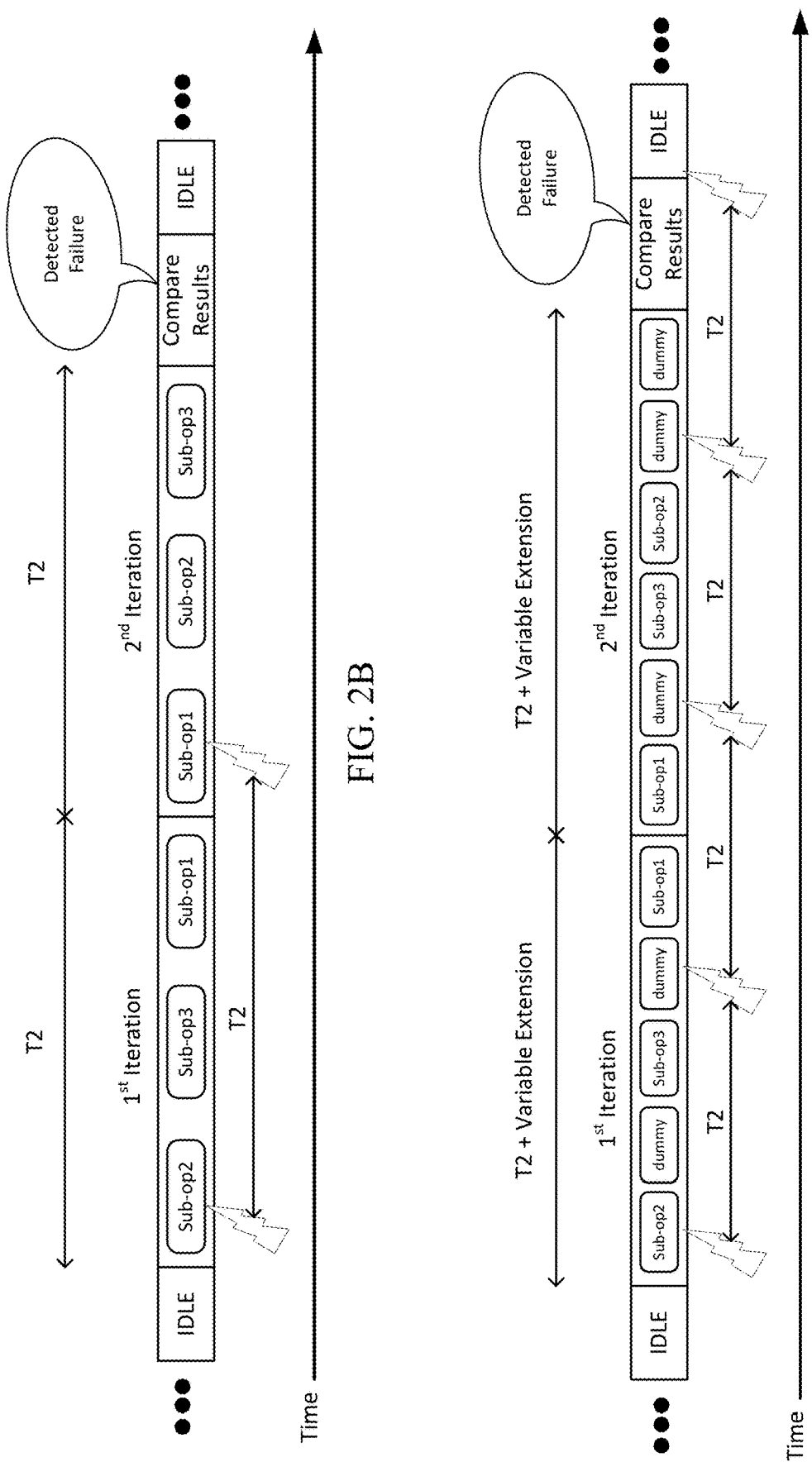

FIGS. 2A-2C illustrate timing diagrams of a DFA attack countermeasure with obfuscation; FIG. 2A shows obfuscation using dummy sub-operations, FIG. 2B shows obfuscation using reordering of valid sub-operations, and FIG. 2C shows obfuscation using both dummy sub-operations and reordering of valid sub-operations. Referring to FIG. 2A, dummy sub-operations can be included during a process in order to adjust the duration of an iteration. Dummy sub-operations can be the same operations as carried out in a valid sub-operation. For example, if the process has three valid sub-operations, the dummy sub-operation may be any of the three valid sub-operations, using either different data or the same data (but the result is discarded). In some cases, the dummy sub-operation is a different operation than any of the valid sub-operations of the process.

Dummy sub-operations can be inserted before the valid sub-operations of the process, interspersed between valid sub-operations of the process, inserted after the valid sub-operations of the process, or a combination thereof. Furthermore, the position and number of dummy sub-operations can be varied for each iteration so that the first iteration and the second iteration are of different durations. In some cases, the dummy operations can include computations of valid sub-operations where the results are discarded instead of used. For example, a same sub-operation can be performed for a valid sub-operation and a dummy sub-operation.

Since the system knows which operations are the dummy sub-operations and which operations are the valid sub-operations, the appropriate result for each iteration can be obtained. Since each iteration has a T2+variable extension duration, it is more challenging for an attacker to determine where/when to disrupt operation. For example, if the attacker uses the same repetitive attack with a period of T2, the DFA attack countermeasure can detect the failure when comparing the result of the first iteration with the result of the second iteration since different parts of the process are being affected than that expected by the attacker and it is possible that one iteration is disrupted more than the other (for example, a dummy sub-process may be the one affected during one iteration while a valid sub-operation is affected in the other iteration).

Referring to FIG. 2B, valid sub-operations can be reordered to obfuscate the operations. For example, the first iteration may be in order of sub-operation 2, sub-operation 3, and sub-operation 1; and then the second iteration is arranged in a different order of sub-operation 1, sub-operation 2, and sub-operation 3. Since the system knows the order at which each operation is occurring, the appropriate result can be determined through appropriate processes. In the scenario shown in FIG. 2B, although the duration of each iteration is the same, if the attacker uses the same repetitive attack with a period of T2, the DFA attack countermeasure can detect the failure when comparing the result of the first iteration with the result of the second iteration since different sub-operations may be disrupted.

Referring to FIG. 2C, a combination of inserting dummy sub-operations and rearranging valid sub-operations can be carried out to further obfuscate the process. In the illustrative example each iteration contains three valid sub-operations and a number of dummy sub-operations. The valid sub-operations are computations relevant to the actual calculation, and the dummy sub-operations can be operations performed on other data or operations that do not affect data being operated on. Additionally, the order in which the valid sub-operations are executed in the second iteration can be different than in the first iteration. The addition of the dummy sub-operations makes the duration more difficult to guess with any reliability, and rearrangement of the valid sub-operations makes synchronization more difficult.

While FIG. 2C depicts two methods in use, either or both of these methods can be used in a particular system at a particular time. For example, some iterations may only include dummy sub-operations, some iterations may only involve rearranging valid sub-operations, and some iterations include both (so long as the valid results are what are compared when performing the illustrated countermeasure). The signal indicating an attack can be used to trigger additional countermeasures or more intense countermeasures. In some cases, the type of obfuscation may adjust in intensity if an attack is suspected to provide increased security for the system. For instance, if the default countermeasure technique is rearrangement of valid sub-operations, such as described with respect to FIG. 2B, and when an attack is suspected to be occurring, the system can start including dummy sub-operations either in addition to or instead of rearranging the valid sub-operations to limit the amount of data the attacker is able to obtain.

Figure 3:
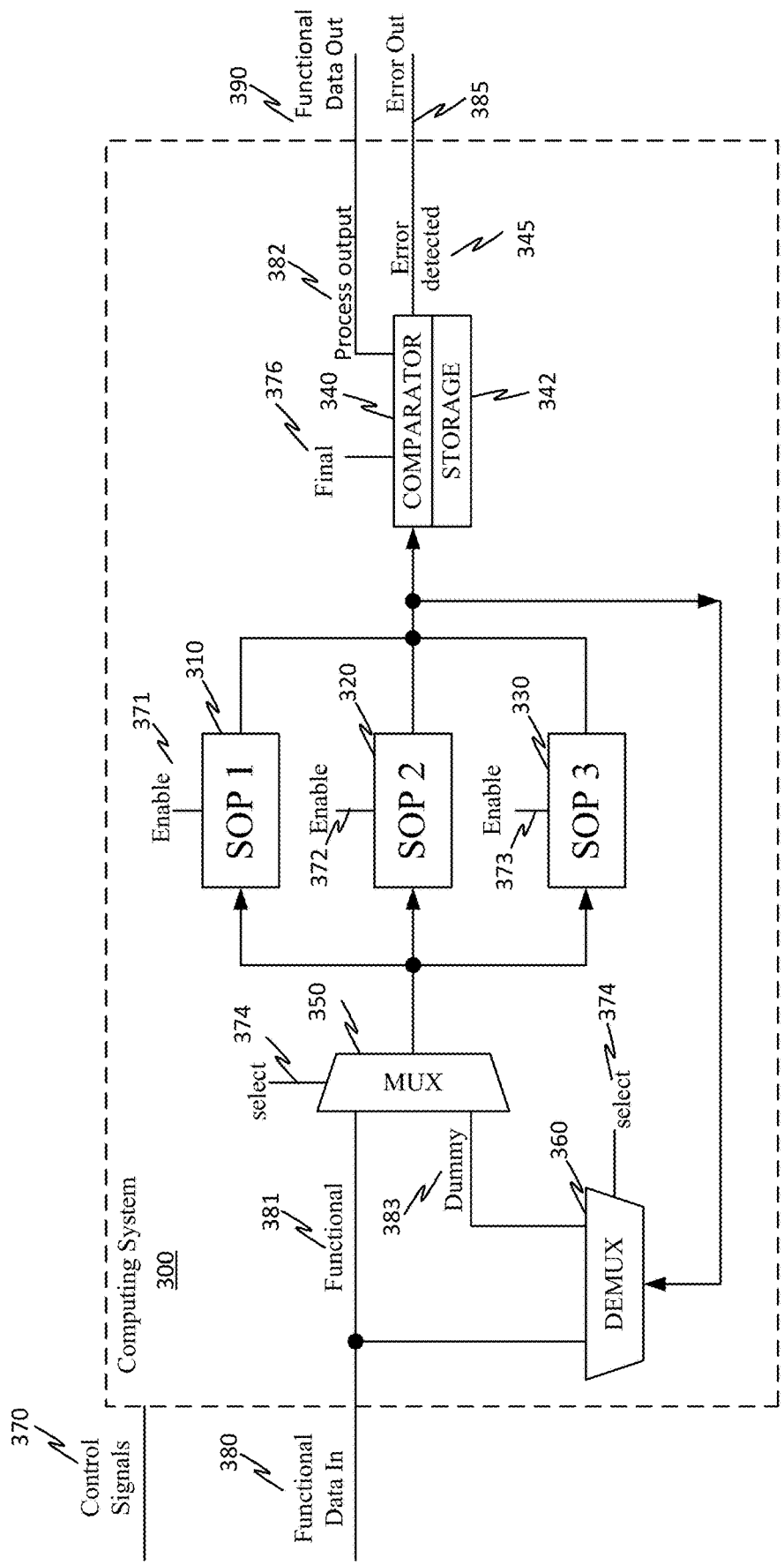
FIG. 3 illustrates an example computing system with a DFA attack countermeasure that may implement the described methods for obfuscation.

FIG. 3 illustrates an example computing system with a DFA attack countermeasure that may implement the described methods for obfuscation. Referring to FIG. 3, system 300 can include circuitry for performing a process that can be grouped into sub-operations. In the illustrative example, three sub-operations may be carried out, SOP 1 310, SOP 2 320, and SOP 3 330. Each of the sub-operations (e.g., SOP 1 310, SOP 2 320, and SOP 3 330) are separately selectable for operation. To perform the countermeasure process of comparing multiple iterations, a comparator 340 and storage 342 are used. For implementing an obfuscation method, system 300 includes control circuitry including a state machine (not shown) and selection circuitry including multiplexer (MUX) 350 and demultiplexer (DEMUX) 360. The system 300 can receive a set of control signals 370 (some of which may come from a state machine of the system 300) and functional data 380. The control signals 370 can include enable signals 371, 372, 373 for the various sub-operations, a select signal 374 to denote whether the operation is a valid sub-operation or a dummy sub-operation, and a perform comparison signal 376 to denote whether the sub-operation is the final in that iteration and the result (e.g., process output 382) is ready for comparison. Prior to or during operation, a first pattern and a second pattern that is different than the first pattern can be generated and/or loaded into the state machine. A first iteration can be controlled according to the first pattern and a second iteration can be controlled according to the second pattern. The first and second patterns include the sequence of valid sub-operations as well as where/when dummy sub-operations would be performed.

The system 300 can output an attack detected signal 385 based on the result of the comparison of the iterations using the comparator 340 (e.g., comparison result 345). The perform comparison signal 376 is applied to indicate when an iteration is completed. Although the perform comparison signal 376 is illustrated as being applied to the comparator 340, it should be understood that the perform comparison signal may be applied to a pass gate or switch such that the comparator 340 simply receives the data at the appropriate time.

In some cases, the comparator 340 stores a first iteration in the storage 342 and then performs a comparison of the next iteration upon receipt of the process output; and then stores that process output in the storage 342 to compare that process output with a subsequent process output. In some cases, the comparator 340 stores the first iteration in the storage 342 and compares each subsequent iteration with the values from the first iteration. As mentioned above, if the comparison result indicates that the iterations do not satisfy the matching condition, then a comparison result 345 of an error detected signal can be output as an attack detected signal 385. The attack detected signal 385 can be received by a processor and used as a trigger to initiate more rigorous defenses. If the comparison result indicates that the iterations do satisfy the matching condition, a process output signal 382 can be output to provide the process result data 390. The process result data 390 can be, for example, a decrypted or encrypted version of the input functional data (depending on the type of process implemented by the sub-operations).

The system 300 can use the MUX 350 and DEMUX 360 to support obfuscation techniques. For example, the select signal 374 can select between a dummy cycle and a valid cycle. The select signal 374 can control a multiplexer 350 that selects from a line of functional (valid) data 381 and one or more lines of dummy data 383. In the case of a dummy cycle, a feed of dummy data 383 is used and put through the system. The dummy data 383 can be pre-seeded data, generated randomly, be an output of a previous dummy sub-operation, be an output of a previous valid sub-operation, or be a byproduct of some other computation. The individual enable signals 371, 372, 373 for the various sub-operations 310, 320, 330 can allow the order of the operations to be changed or allow dummy sub-operations to interrupt the sequence of valid sub-operations. After a cycle of an individual sub-operation is completed, a DEMUX 360 can be used to control whether the intermediate result is sent as valid data to the functional bus (e.g., as functional data 381) for application of a subsequent sub-operation or as dummy data (e.g., dummy data 383) to the dummy line.

Figure 4A:
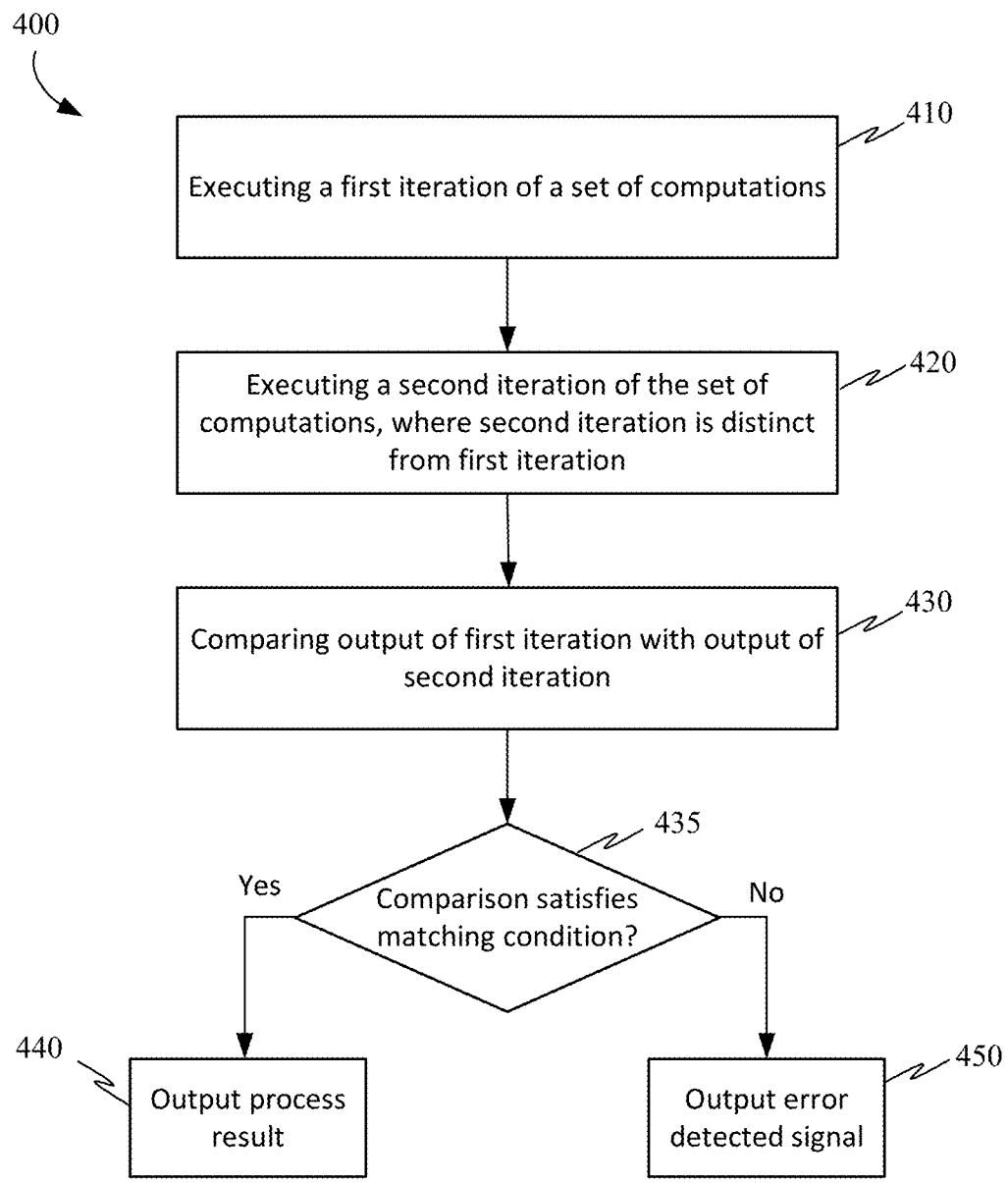
FIG. 4A shows a process flow for an obfuscation method and countermeasure.

FIG. 4A shows a process flow for an obfuscation method and countermeasure. Referring to FIG. 4A, method 400 can begin with executing a first iteration (410) of a set of computations. For example, a cryptographic engine can receive input from a controller including a set of functional data and control signals; and control circuitry such as described with respect to FIG. 3 may be used to control the execution of the set of computations. When the method 400 is being performed as part of a cipher system, the computations may be a decoding process or an encoding process on input received by the system, for example functional input 380 such as described with respect to FIG. 3. The execution of the set of computations during the first iteration results in a first iteration output. A second iteration is then executed (420). The execution of the set of computations during the second iteration results in a second iteration output. The second iteration performs the same set of computations for the cryptographic (or other) process as the first iteration and uses the same input data (e.g., function input 380 such as described with respect to FIG. 3). However, the second iteration is distinct from the first iteration (e.g., having a difference in characteristic). Examples of the second iteration being distinct from the first iteration may include, but are not limited to, reordering of valid sub-operations, inserting dummy sub-operations, or a combination of reordering and inserting that is different from the ordering of the first iteration. For example, an obfuscation method as described in more detail with respect to FIG. 4B can applied to each iteration such that the duration and/or order of operations differs between the two iterations.

After the two iterations are executed (and even after every subsequent iteration), the system compares (430) the first iteration output and the second iteration output (or any two outputs when more than two iterations are performed) to determine (435) whether the outputs satisfy a matching condition. If the comparison is determined to satisfy the matching condition, the process result can be output (440). For example, when the input is plain text and the system performs encryption, the resulting cipher text (that is output as the iteration output from each iteration) is output. If the comparison is determined to not satisfy the matching condition, a signal indicating a detected error can be output (450). In some cases, process result(s) are hidden or discarded in a manner that the system can avoid using incorrect results. In some cases, data is permitted to be output, but just not used by the system for further processing.

The signal indicating a detected error can be output to a processor or other controller as a signal of attack and can trigger more intense countermeasures. More intense countermeasures include, but are not limited to, enabling more methods of obfuscation and increasing the obfuscation of the existing method. For instance, a default level could be simply rearranging the sub-operating in the second iteration. Upon receiving an attack signal, the system could implement insertion of dummy sub-operations. If more signals of attack are received, the number of dummy operations could increase, or still more countermeasures could be introduced.

Figure 4B:
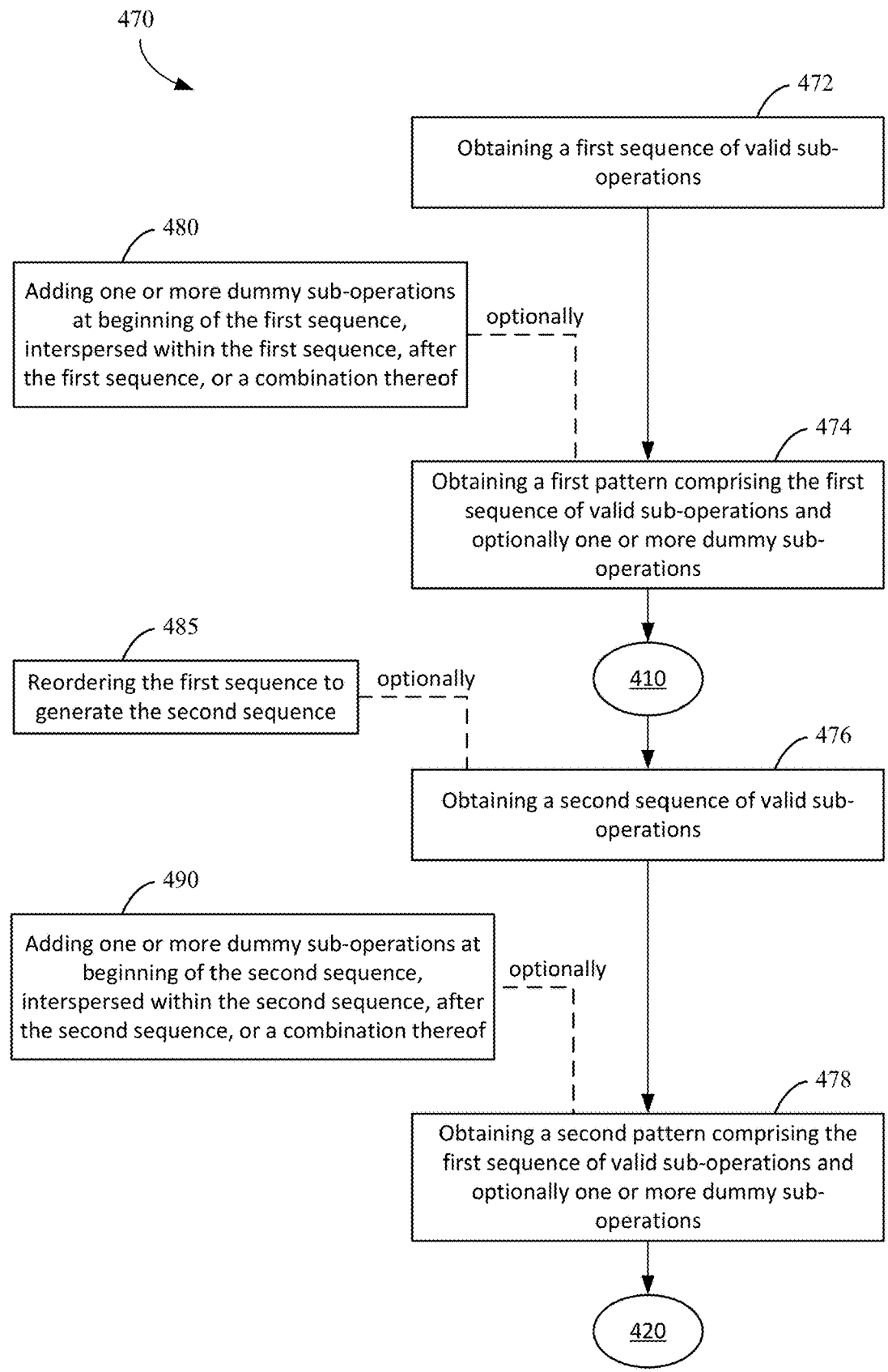
FIG. 4B shows a process flow implementation for obfuscation such that the duration and/or order of operations differs between the first iteration and the second iteration.

FIG. 4B shows a process flow implementation for obfuscation such that the duration and/or order of operations differs between the first iteration and the second iteration. The obfuscation method 470 can begin with obtaining (472) a first sequence of valid sub-operations. The first sequence may be a predetermined or default sequence for the sub-operations. In some cases, the order of the first sequence is a generated order (e.g., using any suitable ordering function). A first pattern for a first iteration is obtained (474) for use during the execution of the first iteration of the set of computations (e.g., operation 410). The first pattern includes the first sequence of valid sub-operations. In some implementations, dummy sub-operations are also included in the first pattern.

The obfuscation method 470 continues with obtaining (476) a second sequence of valid sub-operations. The second sequence may be the same order or a different order as the first sequence, depending on implementation. A second pattern for a second iteration is obtained (478) for use during the execution of the second iteration of the set of computations (e.g., operation 420). The second pattern includes the second sequence of valid sub-operations. In some implementations, dummy sub-operations are also included in the second pattern.

In cases where dummy sub-operations are included in the first pattern, one or more dummy sub-operations can be added (480) in order to obtain the first pattern (e.g., operation 474).

In cases where dummy sub-operations are included in the second pattern, one or more dummy sub-operations can be added (490) in order to obtain the second pattern (e.g., operation 478).

The obfuscation method involves causing the first iteration to be distinct (i.e., different) than the second iteration in some manner.

In some implementations, this can be accomplished by reordering (485) the first sequence to generate the second sequence. For example, the first sequence and the second sequence may be made different by using an ordered seed to generate different arrangements, using an ordering function (e.g., a function that changes the order), or following a predetermined/programmed pattern for different iterations.

In some implementations where the second sequence is a reordered first sequence, the number and locations of the added dummy sub-operations may be the same for both patterns. In some implementations where the second sequence is a reordered first sequence, the one or more dummy sub-operations are added/inserted at different amounts (e.g., fewer or more) and/or positions in the pattern.

In some implementations, the first iteration is caused to be distinct from the second iteration by the use of the dummy sub-operations. Dummy sub-operations can be inserted before the valid sub-operations, interspersed between valid sub-operations, inserted after the valid sub-operations of the process, or a combination thereof. In one case, the second iteration can be different from the first iteration as a result inserting one or more dummy sub-operations into the second iteration during the execution of the series of computations, but with the valid sub-operations in the same order. For example, the first pattern may have no dummy sub-operations and the second pattern has one or more dummy sub-operations. As another example, the first pattern may have a certain number of dummy sub-operations and the second pattern has a different number of dummy sub-operations. In yet another example, the location of the dummy sub-operations in the first pattern and second pattern can be different (with the total number of dummy sub-operations being the same). The number and location of the insertion of the dummy sub-operations can be based on a seed formed at runtime, preprogrammed manually, or determined in some other fashion.

The system knows which operations are the dummy sub-operations and which are the valid sub-operations. The system also knows the reordering of all sub-operations of a process. The matching conditions for the first iteration output and second iteration output are determined according to the specific obfuscation methods known by the system.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for obfuscation of operations, the method comprising:
   obtaining a first sequence of a set of computations to execute as a first iteration, wherein the first iteration of the set of computations comprises valid sub-operations of the set of computations in the first sequence and one or more dummy sub-operations, wherein the one or more dummy sub-operations are at a beginning of the first sequence of the valid sub-operations, interspersed within the first sequence of the valid sub-operations, after the first sequence of the valid sub-operations, or a combination thereof;
   executing the first iteration of the set of computations, the execution of the first iteration of the set of computations resulting in a first iteration output;
   obtaining a second sequence of the same set of computations as executed in the first iteration to execute as a second iteration that is distinct from the first iteration, wherein the second sequence of the second iteration is made distinct from the first sequence of the first iteration by at least having the valid sub-operations in a different order than the first sequence;
   after executing the first iteration, executing the second iteration of the set of computations, the execution of the second iteration of the set of computations resulting in a second iteration output;
   comparing the first iteration output and the second iteration output;
   determining whether the comparing of the first iteration output and the second iteration output satisfies a matching condition; and
   outputting a process result when the matching condition is satisfied and outputting an error detected signal when the matching condition is not satisfied.

2. The method of claim 1, further comprising discarding the process result when the matching condition is not satisfied.

3. The method of claim 1, wherein the second iteration is further distinct from the first iteration by having fewer or more of the one or more dummy sub-operations as compared to the first iteration, by including the one or more dummy sub-operations in different locations as compared to the first iteration, or a combination thereof.

4. The method of claim 1, wherein the dummy sub-operations include computations of valid sub-operations.

5. The method of claim 1, further comprising increasing an intensity of countermeasures upon outputting the error detected signal.

6. A system with operation obfuscation, comprising:
   circuitry for performing a process, the process comprising a plurality of sub-operations, each sub-operation being separately selectable for operation;
   a comparator coupled to receive an output of the circuitry to compare outputs from iterations of the process, the comparator outputting an error detected signal when a matching condition for the outputs from the iterations of the process is not satisfied; and control circuitry coupled to the circuitry for performing the process, the control circuitry configured to:
obtain a first sequence of a set of computations to execute as a first iteration by at least selecting sub-operations of the process, the execution of the first iteration of the set of computations resulting in a first iteration output, wherein the first iteration of the set of computations comprises valid sub-operations of the set of computations in the first sequence and one or more dummy sub-operations, wherein the one or more dummy sub-operations are at a beginning of the first sequence of the valid sub-operations, interspersed within the first sequence of the valid sub-operations, after the first sequence of the valid sub-operations, or a combination thereof; and obtain a second sequence of the same set of computations to execute as a second iteration by at least selecting the same sub-operations of the process, the execution of the second iteration of the set of computations occurring after the first iteration is executed and resulting in a second iteration output, wherein the control circuitry causes the second iteration to be distinct from the first iteration, wherein the second sequence of the second iteration is made distinct from the first sequence of the first iteration by at least having the valid sub-operations in a different order than the first sequence, wherein the comparator is configured to:
compare the first iteration output and the second iteration output;
determine whether the comparing of the first iteration output and the second iteration output satisfies a matching condition; and
output the error detected signal when the matching condition is not satisfied.

7. The system of claim 6, wherein the control circuitry comprises a state machine, a multiplexer (MUX), and a demultiplexer (DEMUX).

8. The system of claim 6, wherein the control circuitry causes the second iteration to be distinct from the first iteration by reordering the valid sub-operations by selecting the sub-operations of the process for the first iteration in a first sequence and selecting the sub-operations of the process for the second iteration in a second sequence.

9. The system of claim 6, wherein the control circuitry is further configured to add one or more of the dummy sub-operations to the sub-operations of the process.

10. The system of claim 9, wherein the control circuitry further controls whether an intermediate result of a sub-operation is sent as valid data to a functional bus or as dummy data to a dummy line.

11. The system of claim 9, wherein the second iteration is distinct from the first iteration by further including fewer or more of the one or more dummy sub-operations as compared to the first iteration, by including the one or more dummy sub-operations in different locations as compared to the first iteration, or a combination thereof.

12. The system of claim 6, wherein the control circuitry is further configured to, as part of obtaining the first sequence of the set of computations to execute as the first iteration and obtaining the second sequence of the same set of computations to execute as the second iteration:
obtain a first set of valid sub-operations;
obtain a first pattern comprising the first set of valid sub-operations and the one or more dummy sub-operations, wherein the control circuitry uses the first pattern to select the sub-operations of the process for the first iteration;
obtain a second set of the same valid sub-operations as the first set of valid sub-operations; and
obtain a second pattern comprising the second set of valid sub-operations and optionally one or more dummy sub-operations, wherein the control circuitry uses the second pattern to select the sub-operations of the process for the second iteration.

13. The system of claim 12, wherein the control circuitry obtains the first pattern by adding the one or more dummy sub-operations at the beginning of the first set of valid sub-operations, interspersed within the first set of valid sub-operations, after the first set of valid sub-operations, or the combination thereof.

14. The system of claim 12, wherein the control circuitry obtains the second pattern by adding the one or more dummy sub-operations at a beginning of the second set of valid sub-operations, interspersed within the second set of valid sub-operations, after the second set of valid sub-operations, or a combination thereof.

* * * * *